US009231865B2

(12) United States Patent
Sankaralingam et al.

(10) Patent No.: US 9,231,865 B2
(45) Date of Patent: Jan. 5, 2016

(54) LOOKUP ENGINE WITH RECONFIGURABLE LOW LATENCY COMPUTATIONAL TILES

(75) Inventors: Karthikeyan Sankaralingam, Madison, WI (US); Eric Nathaniel Harris, Oshkosh, WI (US); Samuel Lawrence Wasmundt, Mosinee, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 183 days.

(21) Appl. No.: 13/572,317

(22) Filed: Aug. 10, 2012

(65) Prior Publication Data

US 2014/0044135 A1    Feb. 13, 2014

(51) Int. Cl.
*H04L 12/28* (2006.01)
*H04L 12/741* (2013.01)
*H04L 12/773* (2013.01)

(52) U.S. Cl.
CPC .............. *H04L 45/745* (2013.01); *H04L 45/60* (2013.01); *H04L 12/2858* (2013.01)

(58) Field of Classification Search
CPC .................... H04L 2012/46; H04L 2012/5618
USPC ......................................................... 370/401
See application file for complete search history.

(56) References Cited

U.S. PATENT DOCUMENTS

| | | | | |
|---|---|---|---|---|
| 4,700,187 A * | 10/1987 | Furtek | ............................. | 326/39 |
| 4,845,633 A * | 7/1989 | Furtek | ............................. | 326/38 |
| 5,151,623 A * | 9/1992 | Agrawal | ........................ | 326/40 |
| 5,705,938 A * | 1/1998 | Kean | ............................... | 326/39 |
| 5,946,706 A * | 8/1999 | Park et al. | ..................... | 711/111 |
| RE37,195 E * | 5/2001 | Kean | ............................... | 326/39 |
| 6,628,653 B1 * | 9/2003 | Salim | ........................... | 370/401 |
| 6,920,562 B1 * | 7/2005 | Kerr | .................... | G06F 9/30003 380/28 |
| 7,042,248 B1 * | 5/2006 | Hutton et al. | .................... | 326/41 |
| 7,818,725 B1 * | 10/2010 | Agarwal et al. | ................ | 717/136 |
| 7,840,914 B1 * | 11/2010 | Agarwal et al. | ............... | 716/102 |
| 8,130,791 B2 * | 3/2012 | Leyrer et al. | ................... | 370/474 |
| 8,145,880 B1 * | 3/2012 | Cismas et al. | .................. | 712/11 |
| 8,250,555 B1 * | 8/2012 | Lee et al. | ...................... | 717/159 |
| 8,250,556 B1 * | 8/2012 | Lee et al. | ...................... | 717/159 |
| 8,291,400 B1 * | 10/2012 | Lee et al. | ...................... | 717/161 |
| 8,327,114 B1 * | 12/2012 | Cismas et al. | .................. | 712/16 |
| 2003/0135710 A1 * | 7/2003 | Farwell et al. | .................. | 712/10 |
| 2003/0154458 A1 * | 8/2003 | Butts et al. | ..................... | 716/17 |
| 2003/0174701 A1 * | 9/2003 | Angle et al. | ................... | 370/390 |
| 2003/0185220 A1 * | 10/2003 | Valenci | .......................... | 370/398 |
| 2004/0060032 A1 * | 3/2004 | McCubbrey | .................... | 716/16 |
| 2004/0205336 A1 * | 10/2004 | Kessler et al. | ................ | 713/160 |
| 2004/0250046 A1 * | 12/2004 | Gonzalez et al. | ............... | 712/11 |
| 2005/0122918 A1 * | 6/2005 | Johnston | ........................ | 370/310 |

(Continued)

OTHER PUBLICATIONS

Venkatraman Govindaraju et al., Dynamically Specialized Datapaths for Energy Efficient Computing, 17th IEEE International Symposium on High Performance Computer Architecture, 2011, University of Wisconsin-Madison, Vertical Research Group.

*Primary Examiner* — Guang Li
*Assistant Examiner* — Joe Combs
(74) *Attorney, Agent, or Firm* — Boyle Fredrickson, S.C.

(57) ABSTRACT

An architecture for a specialized electronic computer for high-speed data lookup employs a set of tiles each with independent logic elements lookup memory portions. The tiles may each comprise gate-array-like functional units that may be wired together by a multi-way switch for extremely low latency.

17 Claims, 7 Drawing Sheets

(56) References Cited

U.S. PATENT DOCUMENTS

| | | |
|---|---|---|
| 2005/0151258 A1* | 7/2005 | Kotecha et al. ............... 257/758 |
| 2006/0098675 A1* | 5/2006 | Okuno ......................... 370/412 |
| 2007/0010205 A1* | 1/2007 | Wielage ....................... 455/63.3 |
| 2007/0200594 A1* | 8/2007 | Levi et al. ..................... 326/38 |
| 2008/0136449 A1* | 6/2008 | Hutton et al. .................. 326/47 |
| 2008/0240090 A1* | 10/2008 | Heller et al. .................. 370/360 |
| 2009/0028150 A1* | 1/2009 | Johnsen et al. ............... 370/392 |
| 2009/0122918 A1* | 5/2009 | Li et al. ........................ 375/317 |
| 2010/0238942 A1* | 9/2010 | Estan et al. ................... 370/401 |
| 2013/0308644 A1* | 11/2013 | Ferguson et al. ............. 370/392 |
| 2014/0115248 A1* | 4/2014 | Kardach et al. ............... 711/106 |

\* cited by examiner

LOOKUP ENGINE WITH RECONFIGURABLE LOW LATENCY COMPUTATIONAL TILES

STATEMENT REGARDING FEDERALLY SPONSORED RESEARCH OR DEVELOPMENT

This invention was made with government support under 0917213 awarded by the National Science Foundation. The government has certain rights in the invention.

BACKGROUND OF THE INVENTION

The present invention relates to specialized electronic devices for looking up data such as may be used in high-speed network routers and switches and, in particular, to a device that may optimize its memory topology for different lookup tasks.

Computer networks allow the exchange of data among spatially separated computers connected by "links", the latter physically implemented as electrical conductors, fiber optics, and radio waves. The dominant network protocols work by dividing a data message into data packets, each of which contains a destination address. The destination address attached to the packets permits the packets to navigate through complex and dynamically changing networks to the destination. When particular links used by a message become crowded or disabled, packets of that message, guided by the destination address, may be routed through different links to reach their destination in a manner invisible to the sender.

A key element in implementing a network using addressed packets is a device called a router (or sometimes a switch) which reads packets' addresses and steers them according to the addresses among the different links joined by the router. For this purpose, the router employs a "routing table" matching packet addresses with ports leading to the different links. The data in the router table maybe manually programmed or may be "learned" using various router heuristics.

Routers may also perform other tasks such as address translation where the packet addresses change for another packet address, or the management of white or blacklists where certain packets may be blocked, for example, to prevent denial of service attacks where the network is flooded with spurious packets from a given address.

All of these functions of a router require the router to look up packet addresses or other packet features in memory, and to perform these operations repeatedly and rapidly. The effectiveness of a router is largely a function of how quickly these memory lookups may be completed.

The memory lookup function may be implemented by a conventional processor reading a table implemented in random access memory. Such memories allow data to be read from identified memory addresses when the address is provided. Finding data with such an architecture requires searching through multiple addresses, a generally time-consuming process. For this reason, high performance routers may use so-called ternary content addressable memories (TCAM) which allow the entire memory to be searched in parallel for the data of interest. These memories substantially reduce the time taken for the memory lookups but are costly and consume considerable power and concomitantly generate greater amounts of heat. Both electrical usage and heat generation can be problems in large data centers.

A possible solution to the problems attendant to rapid memory lookup is the creation of specialized electrical hardware for this purpose. This task, however, is complicated by the variety of different lookup tasks that may be required in a modern router and the need to employ the router in an evolving set of network tasks. For example, currently routers may need to respond to both Internet Protocol (IP) address lookups and local area network (Ethernet-type) lookups. An IP address lookup deals with addresses that have topological significance, that is, different portions of the address represent different networks and sub networks. For IP address lookups, a tree structure may be preferred as the tree allows successively parsing the network address in a manner that reflects the network topology. In contrast, for Ethernet-type lookups the address will typically have no topological significance, representing simply an arbitrary unique number assigned to each device. In this case, the memory lookups are better implemented using a hash table which encodes no topological information about the addresses stored and allows a simpler lookup operation.

As networks grow more complicated and routers are called upon to execute additional tasks, it is likely that current methods for processing packets will prove sub-optimal and changes to the data structures used by routers during packet processing will be needed. Current methods of packet processing may also be sub-optimal for new protocols, extensions to existing protocols, or the introduction of new features for packet processing.

U.S. Pat. No. 7,940,755 entitled "Lookup Engine with Programmable Memory Topology" assigned to the same assignee as the present invention and hereby incorporated by reference, describes a novel computer architecture that flexibly addresses the conflicting goals of high-speed memory operations and the flexibility inherent in reprogrammable hardware. In this design multiple inter-communicating "tiles" are each associated with portions of lookup memory. A variety of different types of lookup tasks may be implemented by programming the individual tiles and a path of intercommunication data among the tiles. This latter programmability allows different architectural topologies to be created that are optimized for different types of lookup tasks.

Each of the tiles may be associated with a von Neumann type processor that may implement a multistep program for processing the data it receives from other tiles (or from a general-purpose processor) and then may pass that data after processing to another tile (or back to the general-purpose processor). In a typical program, data will be passed in a chain between multiple tiles before returning to the general-purpose processor.

SUMMARY OF THE INVENTION

The present inventors have recognized that the processing paradigm of the tile-based system can be moved from tiles of reduced instruction set von Neumann computers to tiles of logical elements implementing more primitive functional elements. In this regard, the inventors believe that any increase in the number of tiles that may be necessary to execute router type functions using these primitive functional elements will be offset by the substantially reduced latency within each tile using high-speed gate-array structures. The logical elements of the tiles may include logical gates that produce an output in a single cycle or a limited number of cycles when associated with a local data store.

In one embodiment, the present invention provides a network router for routing data packets in a network. The router has a series of ports receiving and transmitting data packets and a general-purpose processor communicating with the series of ports to provide for network routing functions including packet processing but exclusive of some data packet lookup functions. In addition, the router has a packet processing engine communicating with the general-purpose processor to receive data therefrom and to conduct memory lookups based on the data. The packet processing engine includes a set of intercommunicating computational tiles, each tile having (1) a set of functional units having inputs receiving arguments and processing the arguments to produce values at outputs; (2) a configuration store for holding program instructions; and (3) a programmable multi-way switch communicating among the functional units to provide switchable direct electrical connection between selected inputs and outputs of the functional units according the program instructions in the configuration store. The functional units may access a lookup memory holding packet related data and the tile includes interconnection circuitry managing intercommunication of data between the tiles.

It is thus a feature of at least one embodiment of the invention to provide a router having hardware-type performance but providing flexibility of programming. The use of tiles and the multi-way switch allows relatively simple hardware elements to be easily arranged to produce sophisticated lookup functions. It is another feature of the invention to permit ready implementation in conventional devices such as field programmable gate arrays.

The interconnection circuitry may move data between tiles according to a clock signal in which at least some of the functional units receive arguments to produce values in a single cycle of the clock signal.

It is thus a feature of at least one embodiment of the invention to provide a low latency processing of data in a tile-based architecture by employing simple but extremely fast functional elements in each tile.

At least one functional unit may be a four-input logical Boolean gate providing a function selected from the functions of: AND, OR, EXCLUSIVE-OR, LESS THAN, GREATER THAN, and EQUAL.

It is thus a feature of at least one embodiment of the invention to provide a versatile functional element useful for many packet processing tasks.

More generally, the single cycle functional units may include an adder, a bit counter, a bit selector, a binary space tree searcher, a two-input logic gate, a four-input logic gate, and the two-input multiplexer.

It is thus a feature of at least one embodiment of the invention to provide a compact set of basic functional elements that may be combined through the tile architecture to provide a variety of high-speed functions for router.

The configuration store may hold multiple sets of program instructions and one set of program instructions may be selected according to bits in the data received by the lookup processor.

It is thus a feature of at least one embodiment of the invention to allow each tile to provide multiple different functions during operation of the router. The program instructions may include configuration bits selecting configurations of multiplexers associated with each functional unit selecting among different sources for the inputs for each functional unit. For example, the sources may be selected from the lookup memory, interconnection circuitry, and the multi-way switch.

It is thus a feature of at least one embodiment of the invention to provide for programmability through a selection of input sources for the functional units.

In some embodiments, the network router may include at least one data store each associated with a single functional unit for receiving and storing values output from the single functional unit and returning the stored values to the arguments of the single functional unit.

It is thus a feature of at least one embodiment of the invention to flexibly permit some multi-cycle computations within the tiles to improve the versatility of each tile for some types of computations.

The program instructions may include configuration bits selecting configurations of multiplexers associated with each functional unit selecting among different sources for the inputs for each functional unit selected from the lookup memory, interconnection circuitry, the multi-way switch and the data store.

It is thus a feature of at least one embodiment of the invention to permit the data store to be programmable and be selected through use of the multiplexer used for the selection of other source signals.

The network router may include at least two clusters of functional units each communicating with a different multi-way switch and inter-communicating through a non-multi-way switch connection.

It is thus a feature of at least one embodiment of the invention to minimize the complex of the multi-way switch necessary to interconnect the necessary number of functional units. By dividing functional units into groups, the size of the multi-way switch may be better managed.

These particular objects and advantages may apply to only some embodiments falling within the claims and thus do not define the scope of the invention.

DETAILED DESCRIPTION OF THE PREFERRED EMBODIMENT

Figure 1:
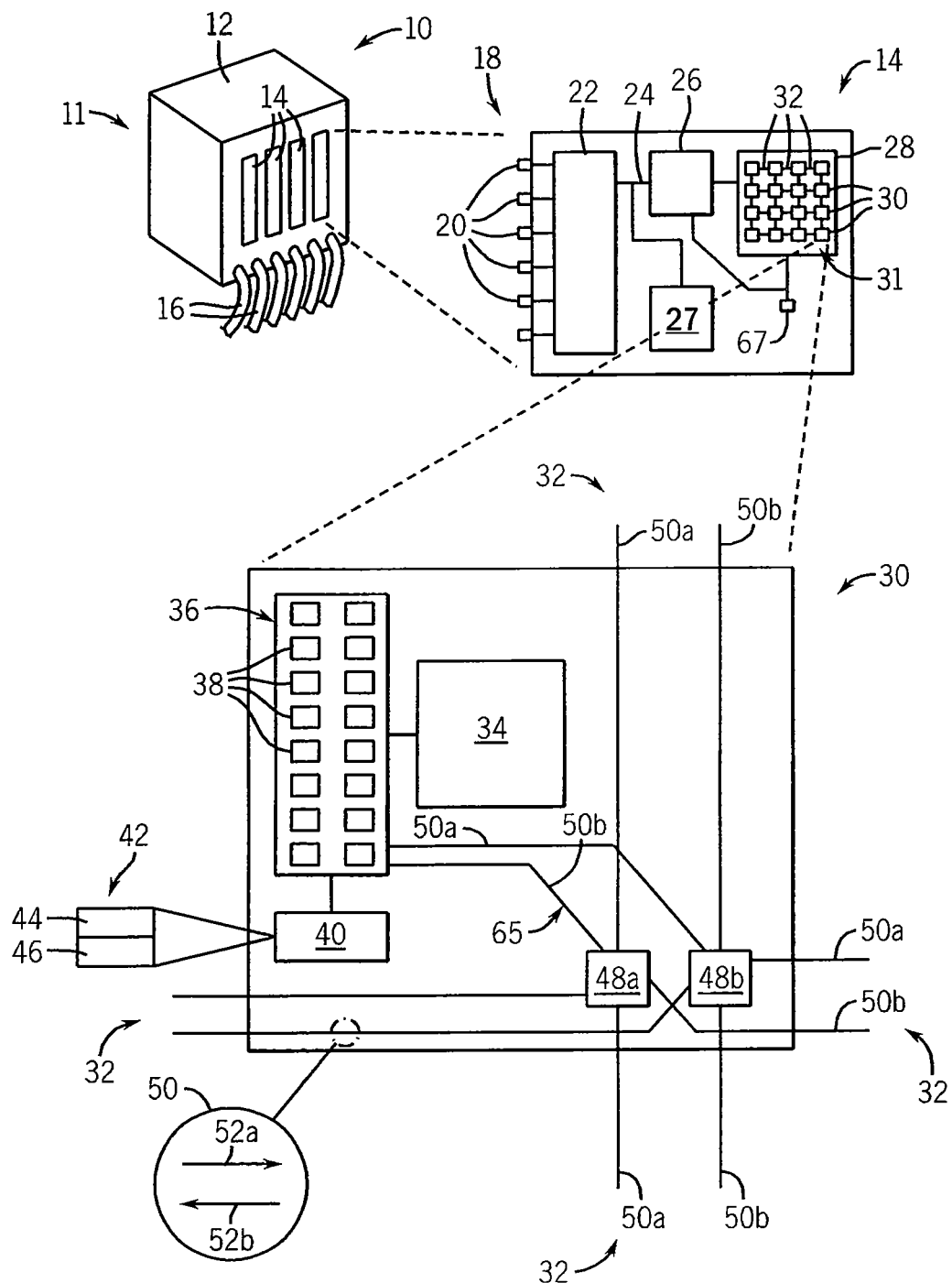
FIG. 1 is a series of successive, increasingly detailed diagrams of a router per the present invention, the router composed of line cards each using a lookup engine having multiple tiles, the figure showing the principal elements of each tile including router circuitry joining the tiles together and multiple functional units operating on a shared memory.

Referring now to FIG. 1, a router unit 10 constructed according to the present invention may include a housing 12 holding multiple line cards 14 typically arranged in modular fashion to connect to a common backplane 11 within the housing 12. The backplane 11 connects the line cards to network media 16, for example electrical conductors, optical fiber, or radio transceivers, each representing different links or ports interconnected by the router unit 10.

In this example, each line card 14 implements a router or switch and provides multiple ports 20 at a rear connector 18 that may connect with the backplane 11 for the receipt and transmission of data packets from and to the network media 16. Each port 20 is received by network interface circuitry 22 on the line card 14, the network interface circuitry 22 handling data level and link level network protocols. The network interface circuitry 22 in turn connects to an internal bus 24 communicating with a general-purpose or network processor 26 (henceforth general purpose processor) and memory 27. Memory 27 may include a combination of volatile and non-volatile memory and holds an effective operating system for the line card 14 and programs executed by the general-purpose processor 26 for managing router functions of the type generally understood in the art.

The general-purpose processor 26 communicates with a special-purpose packet processing engine 28 of the present invention, for example, using a coprocessor type interface in which the general-purpose processor 26 passes distinct memory lookup tasks to the packet processing engine 28. After a known number of cycles that may successively be a memory read, a compute, and a memory write/network write cycle the packet processing engine 28 returns the results of that data lookup.

Referring still to FIG. 1, the packet processing engine 28 is composed of multiple computational tiles 30 arranged in an array 31 of rows and columns that intercommunicate using a communication grid 32, the latter which connects each tile to its immediate neighbors (e.g. east, west, north, south) for the intercommunication of data as will be described.

Each tile 30 holds a portion of a lookup memory 34, the lookup memory implementing, for example, a router table or a whitelist or blacklist that can be indexed by information from a data packet. The lookup memory 34 may be standard random access memory.

The portion of the lookup memory 34 in each tile 30 is addressable only by a compute engine 36 composed of multiple functional units 38 in that tile 30, each functional unit 38 restricted to access only lookup memory 34. The functional units 38 may be simple assemblies of logical gates that may produce output arguments from input values in a single cycle (for example an adder, AND gate, a NOR gate, an OR gate or a NOT gate or the like) and may be used alone or may be coupled with a data store associated only with that functional unit 38 to provide for multi-cycle operation. In one embodiment, the compute engine 36 can read and write up to 128 bits from the lookup memory 34 per cycle.

These functional units 38, as will be described below, may have limited programmability (for example, selecting a type of logic gate e.g. AND, OR, etc.) but are also programmably interconnected. As so interconnected, they may perform a memory read of lookup memory 34 and apply routing headers to data derived from that lookup based on the results of the lookup. Importantly, the functional units 38 may be interconnected so as to conditionally assign a destination (of another tile) to data based on the outcome of an instruction operation. Thus, programming of the functional units 38 permits branch instructions to be implemented by choice of destination in the passing of data among tiles 30 as well as by conventional branching among instructions within the individual tile 30. In one embodiment, each functional unit 38 may incorporate a bit selection filter 217 which can select a number of bits to receive from the input and sign- or zero-extend those bits.

This interconnection of the computational tiles 30 with other computational tiles 30 in the array 31 using the grid 32 and with the general-purpose processor 26 is managed via routing circuits 48a and 48b that provide two physically independent interconnections 50a and 50b within the communication grid 32 between each tile 30 and its neighbor. Each interconnection 50a and 50b provides two conductors 52a and 52b providing for data flowing into the tile 30 and out of the tile 30 respectively so that there is no interference between incoming and outgoing data. Thus, each router circuit 48a and 48b provides interconnections 50a and 50b to each adjacent tile (if any) to the east (right) of the given tile 30, to the west (left) of the given tile 30, to the north (above) of the given tile 30 and to the south (below) of the given tile 30. Tiles 30 at the edge of the array 31 of computational tiles 30, for example having no adjacent neighbors in at least one direction, may communicate directly with the general-purpose processor 26 to receive or transmit data in similar fashion. One more interconnection 50a and 50b is provided from the routing circuits 48a and 48b with the compute engine 36 of functional units 38 so that data passing among computational tiles 30 may be either routed through the tile 30 or routed to the tile 30 depending on its routing header.

Figure 2:
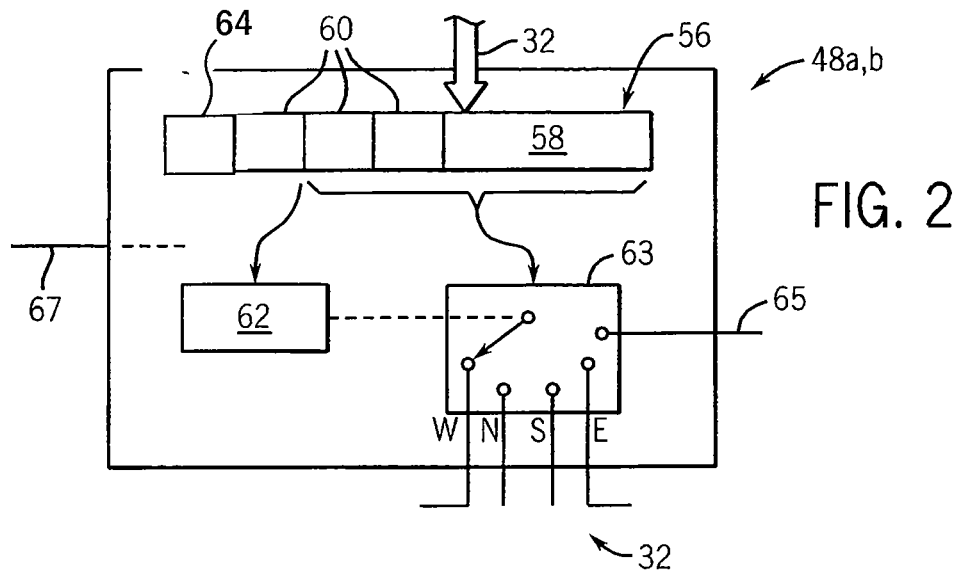
FIG. 2 is a logical diagram of the router circuitry of each tile serving to arrange the tiles for a particular task.

Referring now to FIG. 2, the routing circuits 48 provide for a simple address-based routing of a received data packet 56 arriving on the communication grid 32. The data packet 56 will generally include a payload 58 having the results of the calculation or read of lookup memory 34 of that tile 30 and one or more address headers 60 describing the destination of the payload 58 through the array 31 of tiles and program index bits 61 to be used at the destination tile when the payload 58 arrives to select a program for the data of the data packet 56. One header 60 may provide a multicast flag 64 as will be described. The data packet 56 is received along the grid 32 from one of up to four directions (east, west, north, and south). The particular direction may be ignored (as depicted) or monitored to implement a collision management scheme as will be described below.

The data packet 56 is parsed by the router circuits 48 at each tile 30 receiving the data packet 56 to read the address header 60 (indicating its destination) which is provided to a decoder 62 operating according to a static set of rules that may be preprogrammed and consistent among the computational tiles 30 to control a logical single-pole, five-throw routing switch 63 allowing the remainder of the data packet 56 (the payload 58 plus other routing headers 60 exclusive of the topmost address header) to be routed either east, west, north, south, or to the instant tile 30. For computational tiles 30 within the array 31, each of the first four directions will be to an adjacent tile 30; however, for computational tiles 30 at the edge of the array 31, one of these directions may represent general-purpose processor 26. When the address header 60 for an incoming message is the address of the instant tile 30 receiving the message, the data is routed to the instant tile 30 along the fifth throw 65.

For data packets 56 that are not being sent to an adjacent tile 30, a router circuit 48 at the non-destination tile 30 may follow a simple set of rules to further route the data packet 56. In one embodiment, the router circuit 48 determines whether the destination tile 30 is in the same row as the router circuit 48. If so, the router circuit 48 routes the data packet 56 to the east. Otherwise, the router circuit 48 routes the data packet 56 to the south. This simple set of rules together with knowledge by the router circuit 48 of the location of its tile 30 within the array 31 allows data packets 56 to be sent to non-adjacent computational tiles 30 over several clock cycles.

In one embodiment, a form of multicasting may be implemented by the addition of a multicasting flag 64 in the header 60. This multicasting flag 64 indicates to each router circuit 48 receiving the data packet that the payload 58 should be both forwarded to the destination tile 30 and used by the given tile 30 of the router circuit 48.

The routing circuits 48 may also implement a form of collision management by providing a predetermined priority among packets received from different directions on the grid 32. Thus, for example, in the event of simultaneously arriving data packets 56 from the north and the east at a given tile 30, the given tile 30 may give priority to the data from the north while ignoring the east data. This provides for increased programming flexibility by permitting collision resolution to be used to select among competing data flows.

Referring to FIGS. 1 and 2, data may be sent through the array 31 along the routing circuits 48 in serial fashion under the control of a cycle clock 67 (shown in FIG. 1) generally having clock edges that control not only the execution of instructions by the functional units 38 but also each "hop" in data transfer between computational tiles 30. The routing of the data may thus be preplanned statically by a compiler as will be described so that there is no need for the detection of collisions and retransmission of messages as in the conventional network. For this reason, routing circuits 48a and 48b need not provide for buffering, flow control, or complex network protocols that retransmit in the event of collision. Flow control, as used herein, refers to communications among the computational tiles 30 to control the rate of transmission between computational tiles 30 so that a fast sending tile 30 does not overrun a slow sending tile 30 on the grid 32.

Synchronized by the cycle clock 67, the general-purpose processor 26 may provide lookup requests to the packet processing engine 28 and receive the results a fixed number of cycles later. The lookup request is received from an edge tile 30 and the same or different edge tile may return the result. Multiple computational tiles 30 typically are involved in the lookup process, each of the computational tiles 30 processing the data in a manner controlled by configuration bits 44 to look up data from lookup memory 34 and forward the results to another tile 30 or the general-purpose processor 26.

Instructions controlling the functional units 98 are held in a configuration store 40 holding one or more "programs" 42 that are generally unique to each multiple functional unit 38. The programs 42 will include configuration bits 44 controlling the source of data to the functional units 38, the interconnection of the functional units 38 and topology bits 46 indicating where the results of the execution of the configuration bits 44 will be sent upon completion. Practically, the configuration bits 44 and topology bits 46 may be jointly implemented by a single set of instructions which controls the processing of data in the lookup memory 34 and, based on the results of the lookup, applies headers to data packets to route them to other computational tiles 30 as will be discussed below.

More generally, at each tile 30 involved in the computation, data received by router circuit 48a or 48b for that tile 30 is routed to the compute engine 36 which reads program index bits 61 to select a program 42 in configuration store 40. Before that time the compute engine 36 is idle conserving power. Compute engines 36 that are currently executing according to configuration bits 44 complete instructions synchronized to the cycle clock 67 (often in one cycle) and transmit data through the routing circuits 48a and 48b also synchronized to the cycle clock 67. The functional units 38 of the compute engine 36 select the router circuit 48a and 48b for transmission of data and apply headers for future routing of the data per the topology bits 46 that have been prepared to prevent data collisions by a compilation process to be described.

Figure 12:
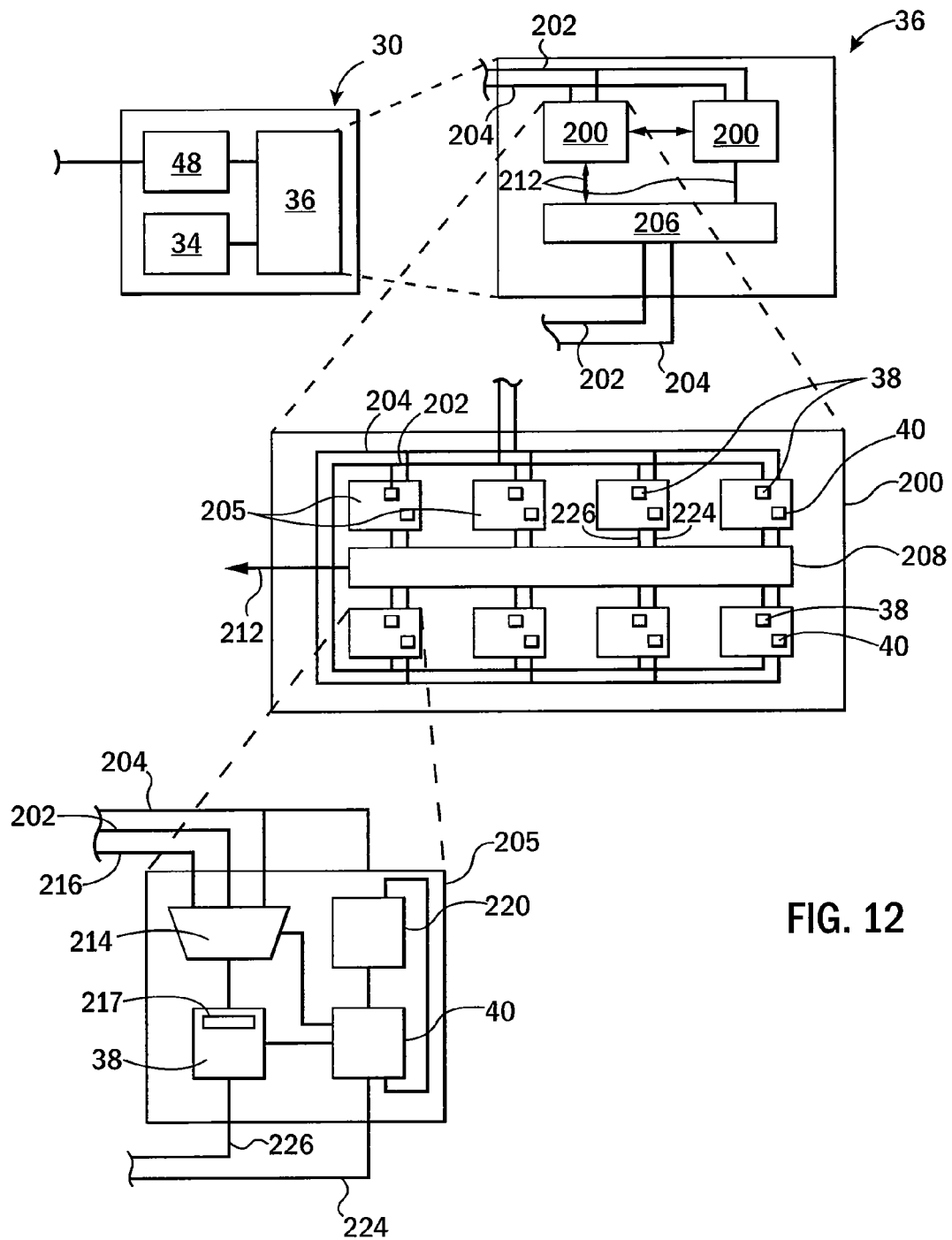
FIG. 12 is a set of expanded views of each tile showing the interconnection of the functional units and construction of the functional unit.

Referring now to FIG. 12, the compute engine 36 may generally provide for two operation clusters 200 each holding a subset of the functional units 38. Each operation cluster 200 receives memory data 202 from the memory 34 and network data 204 from the router circuits 48. Outputs from the operation clusters 200 may be combined by a bit collection unit 206 (as will be discussed below) which returns memory data 202 back to the memory 34 or network data 204 back to the network via router circuits 48.

This division of the functional units 38 between operation clusters 200 accommodates the otherwise extremely high number of interconnections required between, for example, sixteen functional units 38. By breaking the functional units 38 into two operational clusters 200 the number of interconnections can be better managed by practical multi-way switches as now described.

Within each operation cluster 200, the subset of functional units 38 are grouped in operation engines 205 with portions of the configuration store 40 unique to the functional unit 38 and other logic elements required to connect each functional unit 38 as will be described below. Within the operation engines 205, the functional units 38 may receive the memory data 202 and the network data 204. The functional units 38 are further all joined by a multi-way switch, such as a common crossbar switch 208 which, as is understood in the art, allows programmable connections to be formed, selectively, between any input of a functional unit 38 and any output of another functional unit 38. Generally each crossbar switch 208 provides multiple parallel switchable connections each providing an electrical path mimicking that of a wire conductor between one input and one output of a functional unit 38. Multiple pairs of terminals of a crossbar switch 208 can thereby be formed pair wise connecting, in parallel, the functional units 38 according to a control signal expressed, for example, as a set of binary signals. In this way, the functional units 38 may be joined together in chains whose topologies are defined programmably by switching of the crossbar switch 208. Generally the crossbar switch 208 can be tailored to the particular number of inputs and outputs of each functional unit 38 to reduce the number of crossbars. For example those functional units 38 that produce an output of one bit (e.g. Bit Select, described below) can be provided with only a single crossbar for that output.

Generally, and as will be described in greater detail below, when the crossbar switch 208 connects data from one functional unit 38 output to the input of another functional unit 38, that input supplants the connection of that functional unit to the memory data 202 or network data 204. The output 226 of the functional unit 38 is always returned to the crossbar switch 208.

The crossbar switch 208 also provides for an output 212 to the bit collection unit 206, to be combined with the output from the crossbar switch of the other operation cluster 200.

The bit collection unit 206 may, in turn, forward the combined output from the two operation clusters 200 to the memory data 202 or network data 204.

Referring still to FIG. 12, each functional unit 38 provides an input multiplexer 214 which may receive crossbar data 216, memory data 202 or network data 204 as has been described above. The setting of this multiplexer 214 is according to configuration bits 44 in the configuration store 40 as selected by the program index bits 61 previously described. Generally when network data 204 is received from the network, the program index bits 61 in that data packet 56 are received by a configuration selector 220 which selects a particular program 42 to be used with that received data packet 56. The configuration bits 44 of the selected program 42 are then used to further configure the multiplexer 214.

The configuration bits 44 may also be passed to the crossbar switch 208 as crossbar programming data 224 defining the interconnection between functional units 38 and may be passed to the functional units 38 to control their operating characteristics.

Each of the functional units 38 may be a relatively simple gate structure of a number of types generally known in the art. In the preferred embodiment, the functions of the functional units 38 may be selected from seven simple types as provided in Table I below:

TABLE I

| Functional Unit | Description |
| --- | --- |
| Add | Adds or subtracts two values; can also decrement the final value by one |
| Bit Count | Counts the number of bits in all or a subset of the input |
| Bit Select | Shifts the input value logically or arithmetically and selects a subset of the bits |
| Binary Spaced Tree | Performs a binary space tree search comparing an input to input node values |
| Logic-2 | A general-purpose two-input logical gate of the form "a op b" where op is selected from AND, OR, EXCLUSIVE-OR, LESS THAN, GREATER THAN, EQUAL |
| Logic-4 | A general-purpose four-input logical gate of the form "(a op b) op (c op d)" or implements the operation "(a op b) ? c: d" |
| Multiplex 2 | Connects either of two inputs to an output based on a selector input |

In one embodiment, each operation cluster 200 employs one of each of the above functional units 38 plus one additional Logic-4 functional unit 38 which was determined to be used more than the other functional units 38. It will be understood generally that each of these functional units 38 may be implemented as a assemblies of logical gates or other logic elements to produce an output in one clock cycle from a change in the input and that the crossbar switch 208 serves essentially to "wire" multiple of these functional units 38 together into a larger assembly of logical gates for extremely fast yet flexible data processing. The functional units 38 may not necessarily (and typically will not) receive a clock signal but rather operate in the manner of interconnected logic gates to produce an immediate function of the input after a gate propagation delay. Nevertheless, the output will normally be provided well within the cycle of a cycle clock 67 synchronizing movement of data between tiles 30.

The programming of the functional units 38 by the configuration store 218 may select among functions of multifunction functional unit 38, for example, whether the Logic-2 functional unit 38 implements an OR or AND logic gate. The configuration store 218 may further provide an argument to functional units 38 receiving two arguments, for example, such as may be used to implement a branch-based selection of a destination tile for output data, for example, by appending or selecting destination information derived from the topology bits 46 of the configuration store 218 to or from data output from the functional unit 38. It will be appreciated that each of these functional units 38 will typically receive multibit input words to produce a multi-bit output word for each bit described and thus, for example, a Logic-2 gate will be duplicated to provide a gate for each bit of the multi-bit word processed by the functional unit 38. The configuration store 218 may further program a bit selection filter 217 as described above associated with each of the functional units 38.

Figure 13:
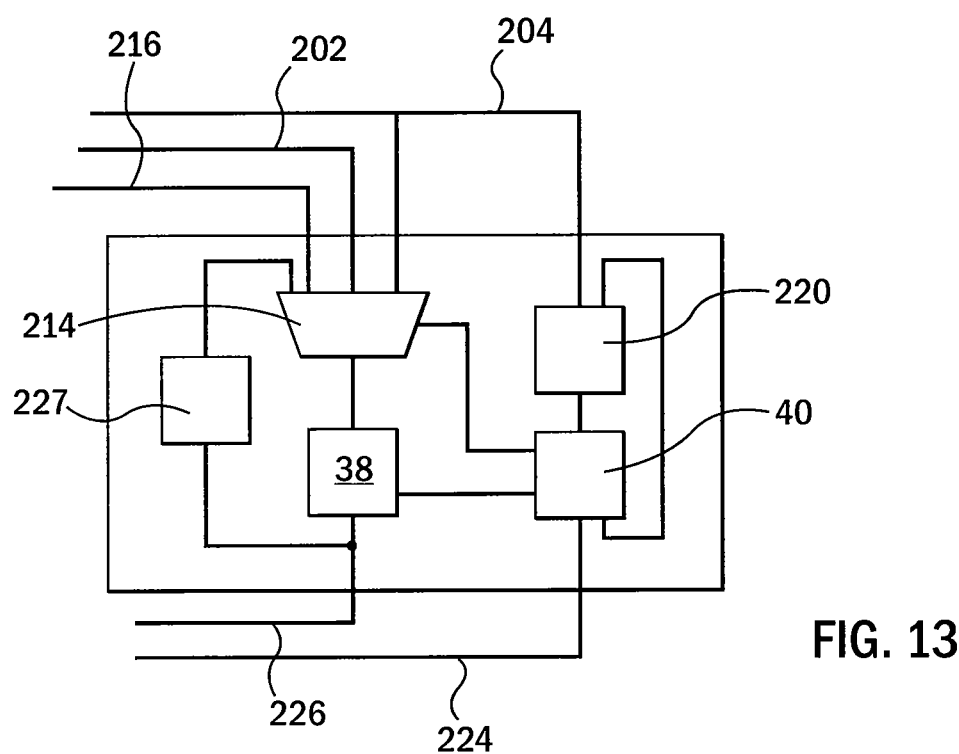
FIG. 13 is an alternative implementation of the functional units providing for some local register storage.

Referring now to FIG. 13, while the functional units 38 will produce their outputs in a single cycle, the present invention also contemplates allowing repeated cycles through a functional unit 38 in which the final result from the functional unit may be delayed by multiple cycles. This may be accommodated by proper routing of data through the tiles 30 to essentially delay the ultimate calculation to accommodate this multiple cycle calculation. Generally, multiple cycle calculations work against the goal of reducing latency but allow a trade-off between latency and the complexity of the computational units 36 to be closer to optimum for some types of calculations.

Multiple cycle calculations may be provided for a given functional unit 38 by associating a data store 227 with an individual functional unit 38 that may store in it an output of the functional unit 38 and provide that output as an input through the multiplexer 214 to that functional unit 38. The data store 227 is local to an individual functional unit 38 and may not be used by other functional units 38. In this way, the complexity of the compute engine 36 is greatly reduced and energy of the data store 227 is also limited.

An experimental analysis employing computer simulations by the inventors has determined that this increase in latency will generally provide improvements in energy usage and total complexity of the circuit for the sort of calculations required by routers. Generally, the configuration store 218 may implement multiple different programs 42 that may be cycled through during each cycle of the functional unit 38 per the above mechanism to allow different configurations or programs between each cycle.

Implementing the data store 227 may be accommodated simply by adding an additional input to the multiplexer 214 to receive the output of the data store 227 and return it to the input of the functional unit 38. Accordingly, proper selection of an input of the multiplexer 214 by the configuration store 40 allows single cycle or multiple cycle operation to be implemented for selective functional units 38.

Figure 3:
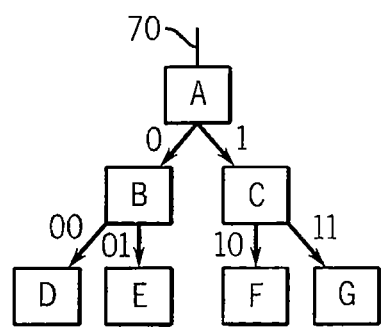
FIG. 3 is a logical diagram of an example tree-type memory lookup task that may be implemented with the present invention.
Figure 4:
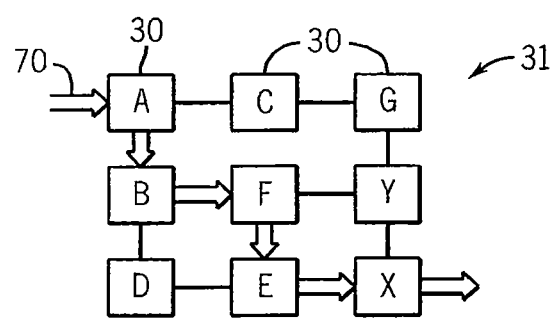
FIG. 4 is an interconnection diagram of a simple set of tiles of the present invention arranged to implement the example lookup task of FIG. 3.

Referring now to FIGS. 3 and 4, it will be understood that the present architecture, by virtue of the ability to freely interconnect the computational tiles 30, allows the topology of the memory of the lookup table divided among lookup memories 34 to be programmably reorganized for effective processing. For example, a memory lookup problem, for example for an IP address, may be logically represented in a tree structure as shown in FIG. 3. In this memory lookup process, incoming IP address data 70 may have three address fields (here represented as a single bit) compared successively at three different levels in the tree. Thus, for example, a first address field may be evaluated with respect to data in memory portion A to identify a network. Depending on the results of that evaluation, the second address field identifying a subnetwork may be compared to data contained in memory portions B or C (depending on the results of the determination at A). At the third level of the tree, a third field representing a lower-level sub-network may be compared to data contained in memory portions D, E, F, or G (depending on the previous evaluations).

Efficient implementation of this tree structure can be done by connecting tiles associated with memory portions A-F in a similar tree using the grid 32 between the computational tiles 30. Thus, referring to FIG. 4 which shows an example tile array 31 of three rows in three columns, the IP address data 70 may be received at tile A in the upper left-hand corner of the array 31 which may be programmed to connect to computational tiles 30 at the second row, first column and first row, second column representing memory portions B and C respectively. Likewise memory portions D and E logically related to memory portion B may be implemented by tiles in the third row, first column, and third row, second column, respectively, adjacent to memory portion B and connected thereto by means of the routing circuits 48. Similarly, memory portions F and G related to memory portion C may be implemented by tiles in the second row, second column, and first row, third column adjacent to the tile implementing memory portion C.

Thus, the computational tiles 30 may be assigned to memory portions as follows:

| A | C | G |
|---|---|---|
| B | F | Y |
| D | E | X | where the tiles labeled Y and X perform no processing but simply provide a conduit interconnecting the tiles. This assignment of tiles to logical memory structures provides one possible organization of the computational tiles 30 for tree type calculations and significantly one that improves the efficiency of the calculation by allowing pipelining type processing. Other arrangements are also possible.

Figure 5:
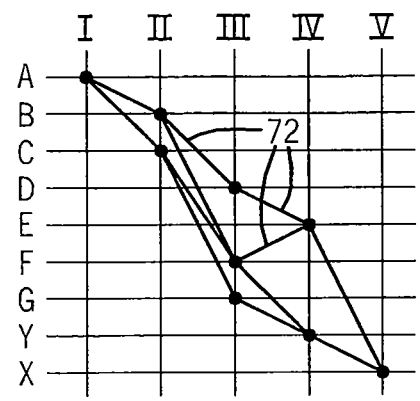
FIG. 5 is a "train schedule" showing the movement of data among the tiles for the example lookup task of FIG. 3

Referring to FIG. 5, the passage of data among computational tiles 30 in this example may be represented in a "train schedule" chart in which the particular tiles are arrayed on the vertical axis and clock cycles are indicated on the horizontal axes in the manner of stations and schedule times in a train chart. The passage of data through the array 31 is represented by trajectories 72. Bifurcations in trajectories 72 represent different branches of the tree of FIG. 3, for example, at the A node during the first clock cycle I, at the C node during the second clock cycle II, etc. Ultimately the data from all trajectories 72 converge at tile X for communication back to the general-purpose processor 26.

Importantly, the schedule of FIG. 5 shows all possible data trajectories 72 for any traversal of the tree of FIG. 3 thus permitting the routing of data to be statically planned by a compiler to ensure consistent delay between the arrival of data at the tile A and its exit at tile X regardless of the trajectories 72 (simplifying the pipelining process) and, in more complicated examples, limiting collisions between data passing through computational tiles 30. It is important to note in this example that only one trajectory 72 from a given tile will be traversed at a time and hence places where trajectories 72 converge on a tile do not represent conflicts in network communication.

Figure 6:
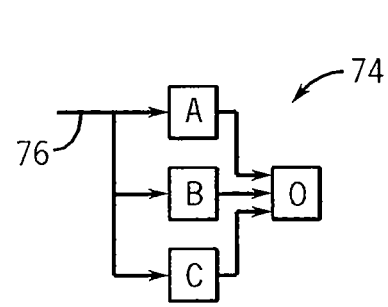
FIG. 6 is a figure similar to that of FIG. 3 showing a logical diagram of an example memory hash lookup task.
Figure 7:
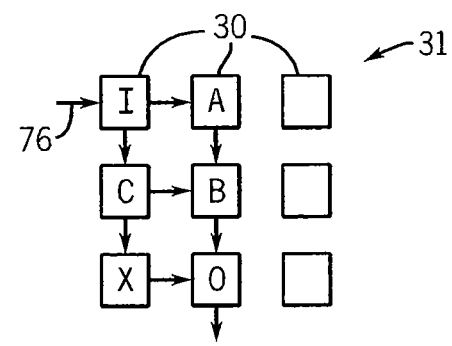
FIG. 7 is a figure similar to that of FIG. 4 showing an interconnection diagram of a simple set of tiles of the present invention arranged to implement the example lookup task of FIG. 5.
Figure 8:
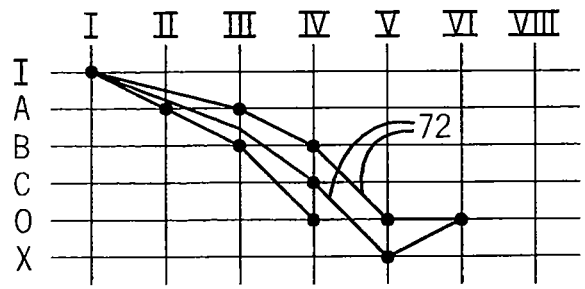
FIG. 8 is a figure similar to that of FIG. 5 showing the movement of data among the tiles for the example lookup task of FIG. 6.

Referring now to FIG. 6, a different memory lookup problem may make use of the completely different memory topology. Consider now a hash table 74 that may be used for Ethernet-type address lookups. Such a hash table 74 may provide for the parallel interrogation of memory blocks A, B, and C using a hash code of the argument 76. The results from each of the memory portions A, B, and C are then assessed at a logical OR-gate. Referring to FIG. 7, this topology may also be implemented through the computational tiles 30 of the present invention. In this case the hashed value of the argument 76 may be received by an input tile I in the upper left-hand corner of the array 31 which may be programmed to connect to the other tiles providing memory portions A, B, and C in parallel per of the hash table topology of FIG. 6. Thus, memory portions A and C may be assigned to tiles in the first row, second column and second row, first column respectively, to connect directly to the tile I while memory portion B may be assigned to a tile in the second row, second column communicating indirectly with tile I via the tile implementing memory portion A acting as a conduit. The results from each of the tiles representing memory portions A, B, and C may then be routed to a tile O for evaluation of the results (whether any individual hash tables have a matching entry) and output to the general-purpose processor 26. Thus, the tiles may be arranged as follows:

| I | A | — |
|---|---|---|
| C | B | — |
| X | O | — | where tile X serves in this example only for routing. The train schedule for this example is shown in FIG. 8 and differs from the example of FIG. 5 in that each of the trajectories 72 is executed simultaneously and thus collisions in the grid 32 and conflicts in processor demands can occur. Initially, node I must transmit the data to be hashed to the tiles representing memory portions A, B, and C in three sequential operations. In this example during the first clock cycle II after receipt of the data at tile I, the tile for memory portion A receives the data. During the second clock cycle III, the tile for memory portion A receives the data for the tile representing memory portion B (as a conduit) and, at a third clock cycle IV, node C receives the data from node I and node B receives the data from node A. Node O then receives the results from nodes A, B, and C over clock cycles IV, V, and VI to provide an output to the processor 26 at VII.

Figure 11:
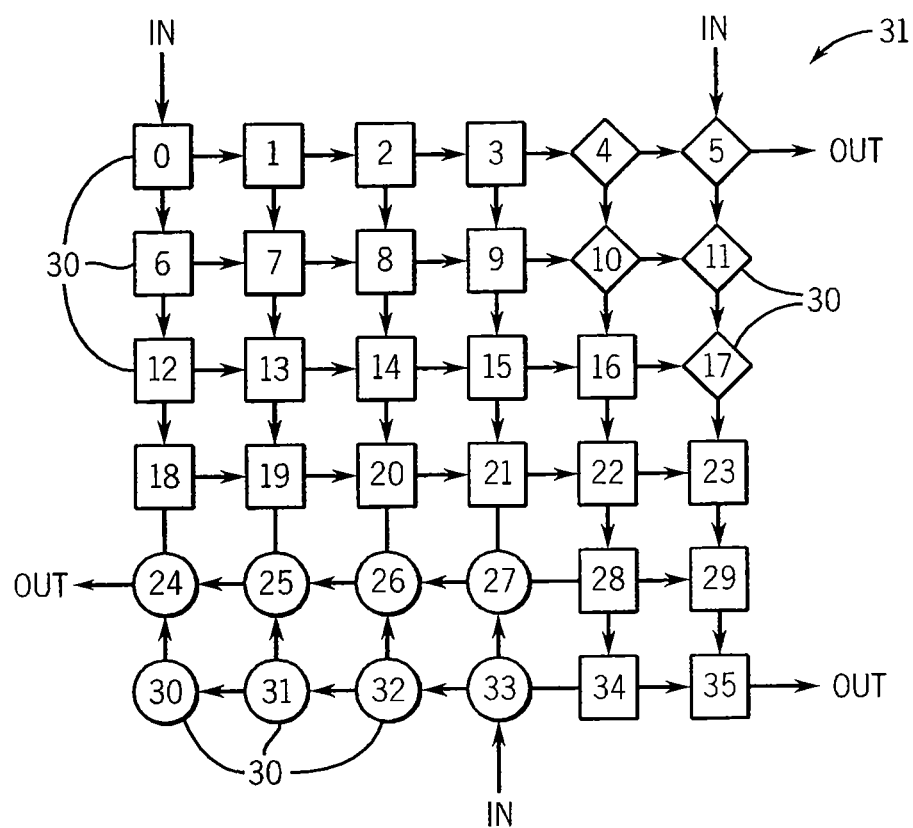
FIG. 11 is a diagram similar to that of FIGS. 4 and 7 showing simultaneous execution of different lookup tasks on the lookup engine of the present invention.

Referring to FIGS. 1 and 11 these simple examples can be routed with no collisions even with a single connection between each tile 30; however, it will be understood that messages may be sent over either the first or second interconnections 50a and 50b further eliminating the risk of collision. In addition, data may be routed through unused nodes or computational tiles 30 to provide for synchronization or effective buffering of the data through the machine. Generally the routing must be performed to conform with the topology of rows and columns of the computational tiles 30; that is, (1) data may only move from a given tile to an adjacent tile in one clock cycle, (2) only one data packet may be received by a given tile for processing in one clock cycle, and (3) at most two data packets may arrive at a given tile in a given clock cycle.

Figure 9:
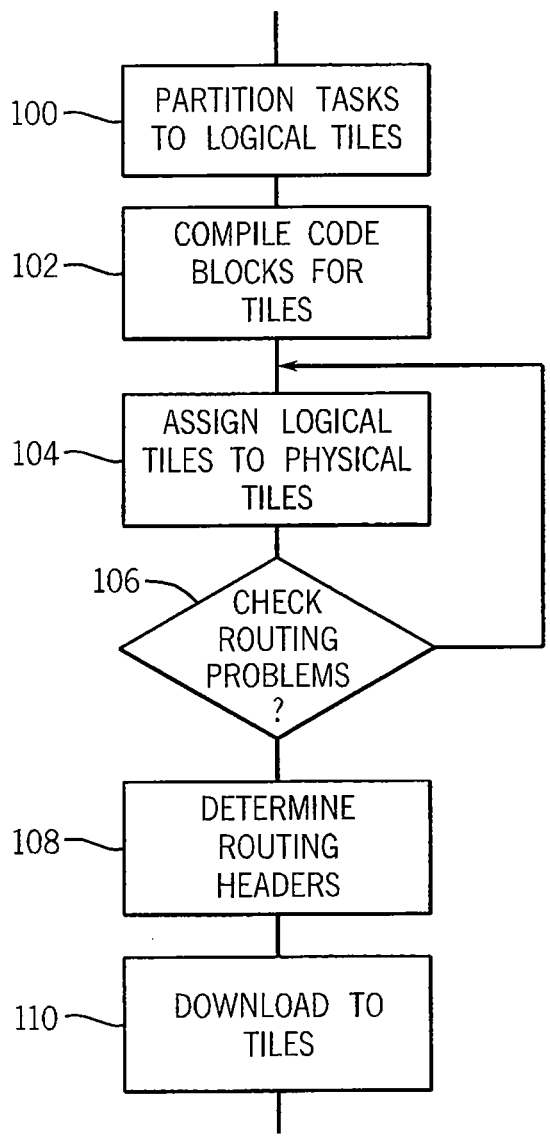
FIG. 9 is a flowchart for a compiler program executing to create programs to be implemented by the functional units of the tiles of the present invention.
Figure 10:
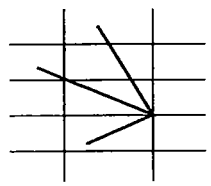
FIG. 10 is a detailed train schedule used by the compiler to identify tile interconnection problems.

Referring now to FIG. 9, the architecture of the present invention, as noted above, makes it possible to programmably reconnect the computational tiles 30 to optimize memory lookup problems in a way that permits the static avoidance of routing problems such as described above. This static routing solution may be fully embodied in the configuration bits 44 and topology bits 46 which together define the operation of the functional units 38 generated at the time of compilation.

The compiling process performed by a program executing typically but not necessarily on a separate processor may, as indicated by process block 100, begin by partitioning lookup tasks to particular logical memory blocks solely and uniquely accessed by those operations. This partitioning process may be done automatically or may allow the user to identify logical memory blocks.

At process block 102, the code blocks associated with the lookups of each logical memory block are written and compiled according to particular instruction sets of the functional units 38. Up to this point, there is no need to relate the memory blocks to particular computational tiles 30.

At process block 104, the logical memory blocks are assigned to two physical computational tiles 30 either automatically or with input from the user. In either case, at process block 106 the assignment is evaluated, for example, by generating the logical equivalent train schedule described above to check for routing collisions, adjacency problems, or the conflicts in the need for resources of the functional units 38. Conflicts may be corrected automatically by the compiler, for example using a trial and error process, or other iterative process or techniques known in the art.

At process block 108, based on the routing selected, the topology bits' 46 entries are computed and, at process block 110, the configuration bits 44 and topology bits 46 are loaded in to the memory of each of the computational tiles 30.

Referring now to FIG. 11 it will be understood that to the extent that the computational tiles 30 operate independently, multiple different lookup problems can be executed by the array 31 simultaneously. This permits, for example, the generation of a router that may decode both IP addresses and the local Ethernet addresses in a gateway-type application. In this case, the computational tiles 30 marked by a rectangle represent those undertaking an IP lookup while the computational tiles 30 marked by a diamond are tiles implementing a packet classification process, and computational tiles 30 marked by a circle are those implementing a hash table for Ethernet lookup.

The architecture of the present invention can generally perform lookup operations and, specifically, lookup operations associated with packet types or addresses. Thus, it can be used not only for routing packets but also for packet classification, deep packet inspection for security applications, and network address translation.

The term router used herein should be understood broadly to include any device providing for packet processing and thus not only routers but also devices that are often referred to as switches.

The functional units 38, and functional units 38 as coupled with a data store 227 unique to the functional unit 38, may be distinguished from general von Neumann machines by the fact that they do not perform a fetch/execute cycle with a memory or register set shared among other functional units. The functional units when separate from the data store of the functional unit produce output values in a single clock cycle and thus are substantially stateless. In a von Neumann machine, the processor say the results of each operation to memory or registers (accessible to all processors) and then read from the memory or registers at the time of the next operation. The functional units 38 do not store the results of their operations in a manner accessible to other functional units until the entire operation for the tile is complete Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a "computer", "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A network router having electronic circuits for routing data packets in a network comprising:
   a series of ports receiving and transmitting data packets;
   a general-purpose processor communicating with the series of ports to provide for network routing functions including packet processing but exclusive of some data packet lookup functions;
   a packet processing engine communicating with the general-purpose processor to receive packet data therefrom and to conduct memory lookups based on the data, the packet processing engine comprising a set of intercommunicating computational tiles, each tile including:
   (1) a set of functional units having inputs receiving arguments of packet data, memory data, and program index bits and processing the arguments to produce values at outputs; the functional units each associated with a multiplexer for selecting between the packet data and memory data for processing by the functional unit in accordance with program instructions selected by the program index bits; wherein the interconnection circuitry moves data between tiles according to a clock signal and at least some of the functional units receive arguments to produce values in a single cycle of the clock signal using functions selected from functions of: AND, OR, EXCLUSIVE-OR, LESS THAN, GREATER THAN, and EQUAL to implement functions selected from the group consisting of an adder, a bit counter, a bit selector, a binary space tree searcher, a two-input logic gate, a four-input logic gate, and the two-input multiplexer;
(2) a configuration store for holding program instructions selected by the program index bits to control the functions implemented by the functional units;
(3) a programmable multi-way switch communicating among the functional units to provide switchable direct electrical connections between selected inputs and outputs of the functional units according to the program instructions in the configuration store selected by the program index bits;
(4) a lookup memory holding memory data related to processing of network data packets and accessible by the set of functional units per the program instructions selected by the program index bits; and
(5) interconnection circuitry managing intercommunication of data between the tiles according to a comparison of data of the received data packets to the memory data in the lookup memory per the program instructions selected by the program index bits.

2. The network router of claim 1 wherein the multi-way switch has terminals connected to each of the inputs and outputs of each of the functional units and provides the switchable direct electrical connections in a manner of a wire conductor between multiple pairs of terminals on a pair wise basis.

3. The network router of claim 1 wherein the configuration store holds multiple sets of program instructions and wherein one set of program instructions is selected according to program index bits in the data received by the lookup processor.

4. The network router of claim 1 wherein the program instructions include configuration bits selecting configurations of multiplexers associated with each functional unit selecting among different sources for the inputs for each functional unit.

5. The network router of claim 4 wherein the sources are selected from the lookup memory, interconnection circuitry, and the multi-way switch.

6. The network router of claim 4 wherein at least one functional unit is a four-input logical Boolean gate programmable by the program instructions to adopt any of the functions of: AND, OR, EXCLUSIVE-OR, LESS THAN, GREATER THAN, and EQUAL.

7. The network router of claim 1 further including at least one data store associated with a single functional unit for receiving and storing values output from the single functional unit and returning the stored values to the arguments of the single functional unit.

8. The network router of claim 7 wherein the program instructions include configuration bits selecting configurations of multiplexers associated with each functional unit selecting among different sources for the inputs for each functional unit selected from the lookup memory, interconnection circuitry, the multi-way switch and the data store.

9. The network router of claim 1 including at least two clusters of functional units each communicating with a different multi-way switch and inter-communicating through a non-multi-way switch connection.

10. The network router of claim 1 wherein an arrival of data at a lookup processor triggers execution of the program instructions from the configuration store and wherein the lookup processor is idle once the program instructions have been completed until a next arrival of data at the lookup processor.

11. The network router of claim 1 wherein the lookup processors include program instructions to implement a function of routing data to specific other tiles dependent on an outcome of a memory lookup of lookup memory.

12. The network router of claim 1 wherein the interconnection circuitry does not provide buffering of transmitted data.

13. The network router of claim 1 wherein the interconnection circuitry does not provide flow control that coordinates a rate of data transmission among tiles.

14. The network router of claim 1 wherein the interconnection circuitry routes data among the tiles according to a routing header applied to the data by the lookup processors according to an execution of the program instructions.

15. The network router of claim 1 wherein the interconnection circuitry routes data between the tiles according to a routing header associated with the data and the interconnection circuitry follows static programmed rules in interpreting the header to route the data.

16. The network router of claim 1 wherein the interconnection circuitry provides at least two physically distinct channels between a tile and the other tiles to which it is connected by channels, each channel providing independent input and output pathways.

17. An electronic computer, comprising:
a series of ports receiving and transmitting data packets;
a general-purpose processor communicating with the series of ports to provide for network routing functions including packet processing but exclusive of some data packet lookup functions;
a packet processing engine communicating with the general-purpose processor to receive packet data therefrom and to conduct memory lookups based on the data, the packet processing engine comprising a set of intercommunicating computational tiles,
each tile including:
(1) a set of functional units having inputs receiving arguments of packet data, memory data, and program index bits and processing the arguments to produce values at outputs; the functional units each associated with a multiplexer for selecting between the packet data and memory data for processing by the functional unit in accordance with program instructions selected by the program index bits; wherein the interconnection circuitry moves data between tiles according to a clock signal and at least some of the functional units receive arguments to produce values in a single cycle of the clock signal using function selected from functions of: AND, OR, EXCLUSIVE-OR, LESS THAN, GREATER THAN, and EQUAL to implement functions selected from the group consisting of an adder, a bit counter, a bit selector, a binary space tree searcher, a two-input logic gate, a four-input logic gate, and the two-input multiplexer;
(2) a configuration store for holding program instructions selected by the program index bits to control the functions implemented by the functional units;
(3) a programmable multi-way switch communicating among the functional units to provide switchable direct electrical connections between selected inputs and outputs of the functional units according to the program instructions in the configuration store selected by the program index bits;
(4) a lookup memory holding memory data and accessible by the set of functional units per the program instructions selected by the program index bits; and
(5) interconnection circuitry managing intercommunication of data between the tiles according to a comparison of data of the received data packets to the memory data in the lookup memory per the program instructions selected by the program index bits.

\* \* \* \* \*